(12) United States Patent
Meraviglia

(10) Patent No.: US 9,363,558 B2
(45) Date of Patent: Jun. 7, 2016

(54) METHODS AND APPARATUS TO MEASURE A CROSS DEVICE AUDIENCE

(71) Applicant: The Nielsen Company (US), LLC, Schaumburg, IL (US)

(72) Inventor: Claudio Meraviglia, Milan (IT)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/547,050

(22) Filed: Nov. 18, 2014

(65) Prior Publication Data

US 2015/0143396 A1 May 21, 2015

Related U.S. Application Data

(60) Provisional application No. 61/906,273, filed on Nov. 19, 2013.

(51) Int. Cl.
*H04H 60/33* (2008.01)
*H04N 21/442* (2011.01)
*H04N 21/45* (2011.01)

(52) U.S. Cl.
CPC ... *H04N 21/44204* (2013.01); *H04N 21/44222* (2013.01); *H04N 21/4516* (2013.01); *H04N 21/4532* (2013.01)

(58) Field of Classification Search
CPC .......... H04N 21/258; H04N 21/25808; H04N 21/25866; H04N 21/25883; H04N 21/44213; H04N 21/44222
See application file for complete search history.

(56) References Cited

U.S. PATENT DOCUMENTS

| 5,675,510 A | 10/1997 | Coffey et al. |
| 6,108,637 A | 8/2000 | Blumenau |
| 6,389,429 B1 | 5/2002 | Kane et al. |
| 6,829,368 B2 | 12/2004 | Meyer et al. |
| 6,941,003 B2 | 9/2005 | Ziesig |
| 7,734,722 B2 | 6/2010 | Seidl et al. |
| 8,175,617 B2 | 5/2012 | Rodriguez |

(Continued)

FOREIGN PATENT DOCUMENTS

JP 2001067332 3/2001

OTHER PUBLICATIONS

International Searching Authority, "International Search Report," issued in connection with International Patent Application No. PCT/US2014/066231, mailed Feb. 26, 2015 (3 pages).

(Continued)

*Primary Examiner* — John Schnurr
(74) *Attorney, Agent, or Firm* — Hanley, Flight & Zimmerman, LLC

(57) ABSTRACT

Methods and apparatus are disclosed to generate a cross device panel by determining that a first panelist associated with a first panel data and a first device is also associated with a non-paneled device. Example methods and apparatus disclosed herein match, via a processor, a second panelist associated with second panel data to the first panelist based on (1) the second panelist having demographics matching the first panelist and (2) the second panelist being associated with a second device corresponding to the non-paneled device of the first panelist, and generate a cross device panelist profile for the first panelist, the cross device panelist profile comprising at least some of the first panel data and at least a portion of the second panel data.

21 Claims, 9 Drawing Sheets

(56) References Cited

U.S. PATENT DOCUMENTS

| | | |
|---|---|---|
| 8,495,682 B2 | 7/2013 | Dierks et al. |
| 2008/0092156 A1* | 4/2008 | Ferrone .......................... 725/13 |
| 2008/0147798 A1 | 6/2008 | Paalasmaa et al. |
| 2008/0288889 A1 | 11/2008 | Hunt et al. |
| 2008/0319829 A1 | 12/2008 | Hunt et al. |
| 2009/0018996 A1 | 1/2009 | Hunt et al. |
| 2010/0205037 A1 | 8/2010 | Besehanic |
| 2010/0268540 A1 | 10/2010 | Arshi et al. |
| 2011/0202270 A1 | 8/2011 | Sharma et al. |
| 2011/0208850 A1 | 8/2011 | Sheleheda et al. |
| 2011/0289193 A1 | 11/2011 | Kim et al. |
| 2011/0314084 A1 | 12/2011 | Saretto et al. |
| 2012/0084206 A1 | 4/2012 | Mehew et al. |
| 2012/0084828 A1 | 4/2012 | Rowe et al. |
| 2012/0109756 A1 | 5/2012 | Kim et al. |
| 2012/0173701 A1 | 7/2012 | Tenbrock |
| 2012/0239407 A1 | 9/2012 | Lynch et al. |
| 2013/0005296 A1 | 1/2013 | Papakostas et al. |
| 2013/0035979 A1 | 2/2013 | Tenbrock |
| 2013/0132328 A1 | 5/2013 | Alush et al. |
| 2013/0151593 A1 | 6/2013 | Shin et al. |
| 2013/0347016 A1* | 12/2013 | Rowe ................... H04N 21/252 725/13 |
| 2014/0106703 A1 | 4/2014 | Williamson et al. |
| 2014/0149577 A1* | 5/2014 | Monighetti ................... 709/224 |
| 2014/0188554 A1 | 7/2014 | Harter et al. |
| 2014/0188941 A1 | 7/2014 | Harter et al. |

OTHER PUBLICATIONS

International Searching Authority, "Written Opinion," issued in connection with International Patent Application No. PCT/US2014/066231, mailed Feb. 26, 2015 (7 pages).

* cited by examiner

401

| SEX | AGE | ETHNICITY | LOCATION | PANEL? | TABLET USAGE? | TABLET USAGE INDEX | SMARTPHONE USAGE? | SP USAGE INDEX | PC USAGE? | PC USAGE INDEX |
|---|---|---|---|---|---|---|---|---|---|---|
| M | 32 | C | WA | PC | N | 0 | Y | 10 | Y | 18 |

405 / 410 / 415 / 420 / 425 / 430 / 435 / 440 / 445 / 450 / 455

| SEX | AGE | ETHNICITY | LOCATION | PANEL? | TABLET USAGE? | TABLET USAGE INDEX | SMARTPHONE USAGE? | SP USAGE INDEX | PC USAGE? | PC USAGE INDEX |
|---|---|---|---|---|---|---|---|---|---|---|
| M | 32 | C | WA | Smartphone | N | 0 | Y | 14 | Y | 18 |
| F | 38 | H | MS | Smartphone | N | 0 | Y | 5 | Y | 7 |
| F | 52 | B | IL | Smartphone | N | 0 | Y | 7 | Y | 3 |
| M | 32 | C | WA | Smartphone | N | 0 | Y | 12 | Y | 12 |
| M | 32 | C | WA | Smartphone | N | 0 | Y | 8 | Y | 6 |
| ... | ... | ... | ... | ... | ... | ... | ... | ... | ... | ... |

METHODS AND APPARATUS TO MEASURE A CROSS DEVICE AUDIENCE

RELATED APPLICATION

This patent claims priority to U.S. Patent Application Ser. No. 61/906,273, which was filed on Nov. 19, 2013, and is hereby incorporated herein by reference in its entirety.

FIELD OF THE DISCLOSURE

This disclosure relates generally to audience measurement, and, more particularly, to methods and apparatus to measure a cross device audience.

BACKGROUND

Traditionally, audience measurement entities determine media exposure and/or device usage data by tracking registered panel members (e.g., panelists). Panelists are users and/or groups of users (e.g., a household) registered on panels maintained by a ratings entity (e.g., an audience measurement entity). That is, an audience measurement entity enrolls people who consent to being monitored in a panel. The audience measurement entity then monitors those panel members to determine media exposure data and/or device usage data (e.g., streaming media usage, browsing usage data, etc.) associated with those panel members. In this manner, the audience measurement entity can derive audience measurement data based on the collected media exposure data and device usage data.

Traditionally, audience measurement entities (also referred to herein as "ratings entities") determine demographic reach for advertising and media programming based on the registered panel members. That is, during enrollment of persons into a panel, the audience measurement entity receives demographic information from the enrolling people so that statistical projections may be made to extrapolate media exposure from those panelists to one or more demographic groups and/or markets.

People may join panels in any of a number of different ways. For example, people may become panelists via, for example, a user interface presented on a device. Additionally or alternatively a person may join a panel via a telephone interview, by completing an online survey, etc. Additionally or alternatively, people may be contacted and/or enlisted in a panel using any desired methodology (e.g., random selection, statistical selection, phone solicitations, Internet advertisements, surveys, advertisements in shopping malls, product packaging, etc.).

BRIEF DESCRIPTION OF THE DRAWINGS

FIGS. 4A-4B are data tables illustrating example profile linkages matched by the example cross device panel generator of FIG. 1.

DETAILED DESCRIPTION

Figure 1:
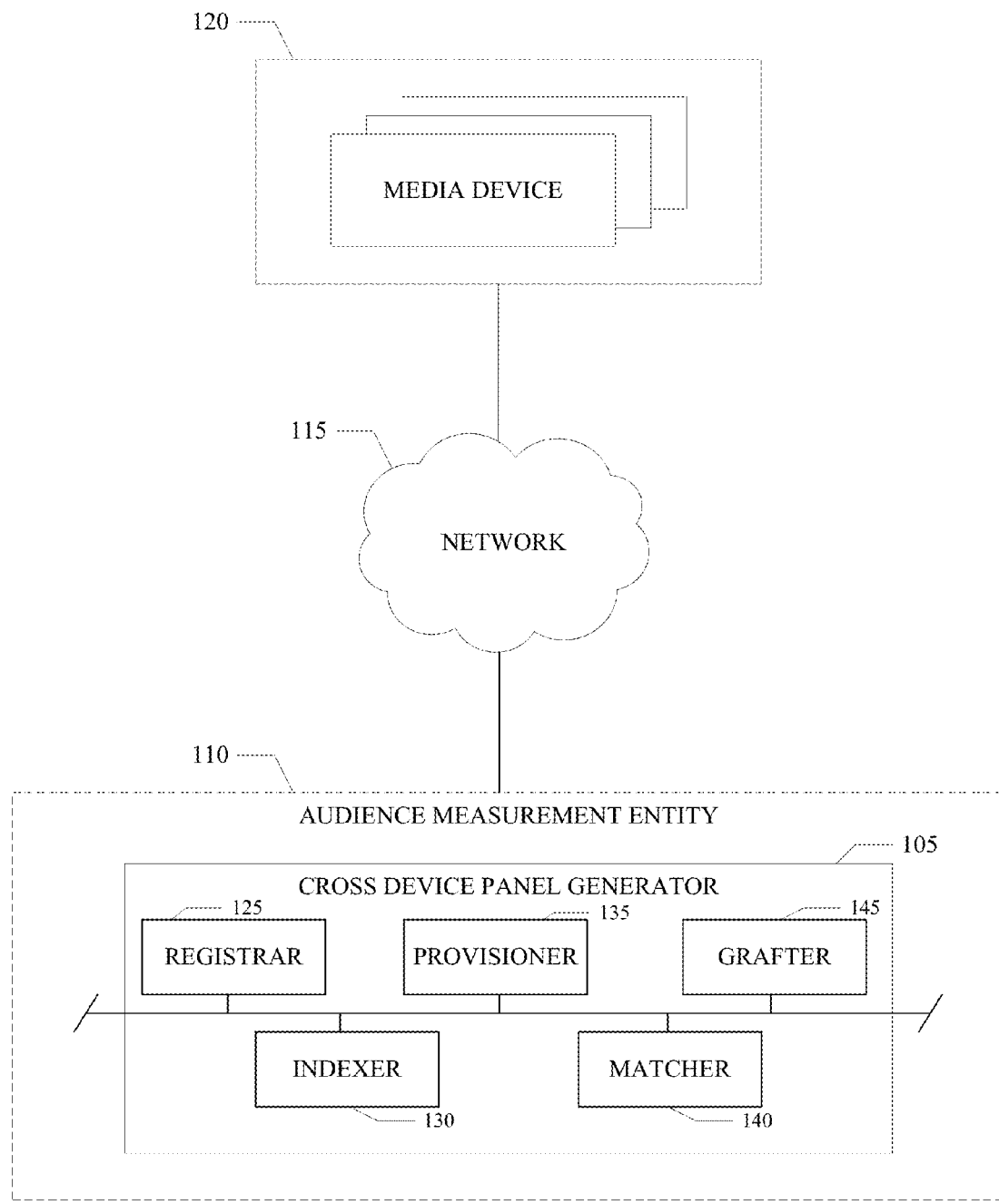
FIG. 1 is a block diagram of an example environment of use in which an example cross device panel generator constructed in accordance with the teaching of the disclosure operates.

Audience measurement entities (AMEs), such as The Nielsen Company (US), LLC, desire to create robust sets of panel data (e.g., data identifying media exposure (referred to herein as media exposure data), panelist identification data, and/or device usage data gathered from panelists). Panel data is often gathered by AMEs from many different media devices and/or monitoring devices associated with panelists. In some examples, panel data is gathered from surveys and/or questionnaires administered to the panelists. Media devices may include, for example, personal computers (PCs), smartphones, tablets, streaming media devices (e.g., Roku™, AppleTV™, etc.), game consoles, etc. Panel data may include device usage information such as, for example, application identification data, device identification data, device usage durations, etc. Panel data may also include media exposure data identifying media, durations of exposure to media, etc. Panel data may also include panelist identification data that identifies and/or permits identification of persons, demographics, descriptive data about the panelist, and/or various other type(s) of information. Thus, as used herein, panel data is any combination of device usage information, media exposure data, and/or panelist identification data associated with one or more panelists.

Panel data is typically collected using different mechanisms for different devices. For example, media exposure and/or device usage data for a PC may be collected using different techniques than techniques used for collecting panel data relating to smartphone usage which in turn is different from techniques used for collecting panel data relating to desktop computer usage. Accordingly, panels are often constructed to collect panel data for the same type of device (e.g., single device panels such as a panel for smartphones). As AMEs collect sets of panel data, trends (e.g., exhibited patterns of exposure and/or popularity of media relating to certain device types, etc.) may be detected.

Combining panelist identification data (e.g., demographics and/or other descriptive information about the panelist(s) such as a geographic area of the panelist) with media exposure and/or device usage data allows broader insight into audience behavior. For example, sets of media exposure data may be grouped using panelist identification data (e.g., demographic data) to determine correlations between media exposure trends and demographics.

It is advantageous to determine (1) how a user interacts with their device(s) throughout a day and to determine (2) media to which a user is exposed via such devices and/or other devices (e.g., devices owned by others and exposed to the user at, for example, a public place). Example methods and apparatus disclosed herein aggregate panel data from multiple different types of panelist devices and/or panels to create a cross device profile for use in developing a cross device panel.

The example cross device profile is a representation of media exposure and device usage data for a same panelist (e.g., a same individual) across two or more different devices and/or panels. Thus, the cross device profile of a panelist may reflect media access and/or usage of all devices (or a subset of all devices) of that panelist. In some examples, a cross device panelist profile includes panelist identification data such as a collection of descriptive information associated with the panelist (e.g., demographics, geographic data, etc.) and media exposure and/or device usage data for multiple (e.g., two or more) devices associated with the panelist. In some examples, aggregating panel data from multiple different devices into a cross device profile creates new datasets that may be analyzed by AMEs to develop more accurate cross device usage, cross device interaction and/or media exposure data. In some examples, the cross device profile is a data structure(s), a file(s), a database entry(ies), etc., containing panelist identification data and/or media exposure and/or device usage data. As used herein, a single device panel is a panel that contains data of a single device type (e.g., television, smartphones, tablets, PCs). While each device in the single device panel is not required to be identical, the devices in the single device panel are of the same general type (e.g., a smartphone panel monitors smartphones but each smartphone need not be of the same brand and/or model).

As used herein, a cross device panelist profile is a profile created for use in a cross device panel (e.g., a panel that contains audience measurement data for two or more different device types (e.g., two or more of smartphones, televisions, desktop computers, etc.)). For example, a cross device panelist profile may be created for a panelist of a single device panel or the profile may be created for a newly registered panelist (e.g., a user who has enrolled in the cross device panel and does not yet belong to a single device panel). When the cross device panelist profile is created, the demographic information associated with the panelist of the single device panel is likewise associated (e.g., transferred, copied, linked, etc.) to the newly created cross device panelist profile. Any collected data for the panelist (e.g., media exposure data, device usage data, etc.) may also be associated (e.g., transferred, copied, linked, etc.) to the cross device panelist profile.

In example methods and apparatus disclosed herein, for the purpose of creating a cross device panel, panelists of a single device panel and/or other individuals (e.g., prospective panelists) are asked to complete a cross device usage survey. As used herein, a cross device usage survey is a collection of questions requesting that a panelist (or prospective panelist) identify which devices they use and/or questions requesting estimates of usage durations of those devices (e.g., weekly, daily, monthly usage estimates). In some examples, a cross device usage survey requests a panelist (or prospective panelist) to provide detailed demographic and/or personal information such as education level, income, and/or media preferences (e.g., in instances where the data is not available from data of an existing single device panel). As used herein, a cross device usage survey response is a collection of data containing responses to the questions provided in the cross device usage survey. In some examples, cross device usage survey responses are associated with the panelist (or prospective panelist) who provided the responses and/or the device from which the cross device usage survey responses originated.

In some examples disclosed herein, cross device profiles are created by importing (e.g., donating) panel data from panelists of single device panels in to cross device profiles. Upon generation, the example cross device panel includes the panel data from the single device panel.

To begin adding panel data for additional devices to the cross device profile, a cross device usage survey is distributed by an AME to panelists of a single device panel (e.g., panelists who are registered to a single device panel). Such panelists of a single device panel may also utilize other devices that may or may not be registered to another panel. In some examples, the usage of these non-paneled devices (e.g., devices not registered to a panel but utilized by a panelist that belongs to a panel associated with another device of the panelist) may be inferred, determined, and/or simulated using example methods disclosed herein. The example cross device usage survey of some examples requests that panelists indicate and/or estimate their usage of other devices. In some examples, the cross device usage survey requests that the panelist identify if other devices of the panelist are currently registered in a panel. The example cross device usage survey also requests that the panelist provide other information such as, for example, demographic information, education level (e.g., high school, college, post-graduate, etc.), media genre preferences (e.g., comedy, drama, action, educational, etc.), income bracket, regional location (e.g., city, state, zip code, etc.), employment status (e.g., full-time, part-time, etc.), cellular service carrier, housing type (e.g., apartment, condo, house, etc.), etc.

In some examples, where other devices of the panelist are not registered to another panel, the cross device usage survey requests that the panelist consent to joining the non-paneled devices in corresponding panels which can be aggregated under the newly generated cross device panelist profile. When a single device panelist consents to joining the non-paneled devices in corresponding panels, the AME attempts to register the other devices of the panelist to the corresponding panels and/or provides meters (e.g., device meters, metering software, etc.) for monitoring the non-paneled devices. When registration and meter installation are successful, the media exposure and/or device usage data for the cross device panelist are collected and associated (e.g., transferred, copied, linked, etc.) with the cross device panelist.

In some examples, some of the single device panelists that have been asked to register as cross device panelists after completion of the cross device usage survey may fail to actually participate in the cross device panel (e.g., fail to download additional metering software to the previously non-paneled devices, fail to complete registration for additional single device panels, etc.). As used herein, a non-complete panelist is a panelist of a single device panel that fails to properly complete the tasks for joining the cross device panel. When a panelist of a single device panel (e.g., a non-complete panelist) fails to properly complete the cross device panelist registration process after completing a cross device usage survey (e.g., when the panelist of the single device panel indicates usage of other devices but those devices are not registered (e.g., missing devices)), a cross device panelist profile is still generated for the non-complete panelist of the single device panel using example methods and apparatus disclosed herein. In some such examples, the cross device panelist profile for the non-complete panelist is created by identifying another panelist with characteristics that match the non-complete panelist. Panel data, such as device usage and/or media exposure data from a panel(s) associated with a device type(s) of the non-paneled device(s) of the non-complete panelist, from the identified panelist is donated (e.g., copied, transferred, linked, etc.) from the match to the newly generated cross device panelist profile of the panelist of the single device panel.

For example, a first panelist (e.g., a panelist registered for a PC panel) may complete a cross device usage survey indicating above-average (e.g., an average based on other panelists) weekly usage (e.g., usage in hours) of the PC and indicating well below average weekly usage on a non-paneled smartphone. A second panelist (e.g., a panelist registered for a smartphone panel) may complete the cross device usage survey indicating, similar to the first panelist, above-average weekly usage of a non-paneled PC and indicating well below average weekly usage on a smartphone registered to the smartphone panel. In example methods and apparatus disclosed herein, a first cross device panelist profile is generated for the first panelist and a second cross device panelist profile is generated for the second panelist. In some examples, the first and the second panelist are matched (e.g., from a pool of a plurality of panelists) using, for example, the cross device usage survey responses and device usage data (e.g., the first and second panelists may be matched using demographics, descriptive information, device usage data, etc.). In such an example, potential matches for the first panelist are filtered by demographics, and further filtered (if necessary) by cross device usage survey responses. For example, the first and the second panelist are matched because they are both thirty year old Caucasian males with matching cross device usage survey responses. That is, the second panelist is the only remaining panelist after filtering by demographics and cross device usage survey responses. In other examples, the first and the second panelist are matched using a combination of, for example, cross device usage survey responses and actual device usage data.

In some disclosed examples, when the first and the second panelist are matched, panel data of the second panelist (e.g., the smartphone panel data of the second panelist) is donated (e.g., imputed, extracted, copied, transferred, mirrored, cloned, linked etc.) to the cross device panelist profile of the first panelist. Thus, because smartphone panel data has been donated to the cross device panelist profile of the first device, the resulting cross device panelist profile of the first panelist contains media exposure and device usage data for a PC and a smartphone even though the smartphone of the first panelist was not registered to a panel and exposure data was not collected on the smartphone of the first panelist.

FIG. 1 is a block diagram of an example environment in which example methods, apparatus, and/or articles of manufacture disclosed herein may be used for measuring media exposure and/or device usage and/or to identify the characteristics of an audience of media. The example environment of FIG. 1 includes an example network 115, and example media devices 120. In the example of FIG. 1, an audience measurement entity 110, such as The Nielsen Company (US), LLC, operates an example cross device panel generator 105 within the environment to measure media exposure and/or device usage and/or identifying the characteristics of an audience of media. The example cross device panel generator 105 includes an example registrar 125, an example indexer 130, an example provisioner 135, an example matcher 140, and an example grafter 145.

The example media devices 120 of the illustrated example of FIG. 1 are typically panelist owned or leased devices that receive and/or retrieve media from a media provider via the example network 115. In some examples, the media devices 120 present media without assistance from another device (e.g., via an integrated display) while, in other examples, the media devices 120 present the media on separate media presentation equipment (e.g., speakers, a display, etc.). Thus, as used herein "media devices" may or may not be able to present media without assistance from a second device. Media devices are typically consumer electronics. For example, the media device 120 of the illustrated example is a personal computer such as a desktop computer that presents media via an integrated and/or connected display and speakers. Other media devices may include Internet-enabled mobile handsets (e.g., a PlayStation Vita™, a Nintendo 3DS™, an iPod®, iPhone®, Android smartphones, etc.), video game consoles (e.g., Xbox® One, PlayStation 4, etc.), digital media players (e.g., a Roku® media player, a Slingbox®, a TiVo®, etc.), televisions (e.g., smart televisions), laptop computers, media servers, etc.

In the illustrated example, each of the media devices 120 are associated with people and/or groups of people who have agreed to be monitored by the audience measurement entity 110 (e.g., panelists of a single device panel). In the illustrated example, people and/or groups are registered as panelists via a user interface presented on the corresponding example media devices 120. Additionally or alternatively, people and/or groups of people may be registered as panelists via, for example, a telephone interview, an online survey, etc. Additionally or alternatively, people and/or groups of people may be contacted and/or enlisted for the panel using any desired methodology (e.g., random selection, statistical selection, phone solicitations, Internet advertisements, surveys, advertisements in shopping malls, product packaging, short messaging service (SMS) messages to numbers in an opted-in database, SMS messages to random numbers, emails to email lists, online access panels, mobile access panels, online banners, mobile banners, in-application advertising, mobile affinity groups, Facebook™ online marketing, offer walls, etc.).

In the illustrated example of FIG. 1, current panelists of a single device panel associated with the media devices 120 are asked to complete a survey about cross device usage and are invited to agree/consent to be registered to a cross device panel. The example survey is transmitted by the example registrar 125 to the media devices 120. Upon receipt of the panelists' agreement/consent to join the cross device panel, the example registrar 125 creates a respective cross device panelist profile for each of the consenting panelists of a single device panel. The example registrar 125 of FIG. 1 transmits registration instructions (e.g., instructions for configuring media devices to use a proxy server are disclosed in U.S. Pat. Nos. 8,594,617 and 8,886,773, and in U.S. Publication No. 2012/0042367 each of which is hereby incorporated by reference in its entirety) and/or metering software to the cross device panelists and/or media devices owned by the cross device panelists to monitor media exposure and/or device usage. Panelist data collected from newly registered devices is then associated with the respective cross device profile of the respective cross device panelist. For example, a panelist registered for a PC panel may complete a cross device usage survey and report usage of a non-paneled smartphone. The example registrar 125 invites the example panelist to join a smartphone panel so that panel data collected for the smartphone panel can be included in the cross device profile create for the panelist.

In some examples, when a panelist of a single device panel registers to be a cross device panelist, other devices of the panelist that is being registered as a cross device panelist are already registered to another single device panel of the audience measurement entity 110. In such instances, the panelist provides an identification of the device(s) (e.g., a user identifier for the other single device panel, etc.) to the example registrar 125 which collects panel data from the other devices and associates the panel data with the new cross device panelist.

In some examples, a panelist of a single device panel associated with one of the media devices 120 provides responses to the survey indicating multiple device usage, yet fails to complete registration to participate in the cross device panel for one or more reasons (e.g., fails to download the metering software, fails to complete the cross device panelist registration process, etc.). When such a panelist of a single device panel indicates usage of multiple devices, a cross device panelist profile is created for the panelist of the single device panel. Alternatively, if a panelist of a single device panel does not indicate usage of another device, no corresponding cross device panelist profile is created for the panelist of a single device panel.

In the illustrated example, the example indexer 130 of FIG. 1 collects cross device usage survey responses and panel data (e.g., media exposure and/or device usage data) from the example media devices 120 via an example network 115 to generate usage indices (e.g., values representative of usage durations compared to an average device usage duration) for device usage of device types (e.g., television, smartphone, tablet, PC, etc.). As used herein, the index value provides a representation (e.g., a value, a ranking, etc.) of a usage duration as compared to a population of usage durations (e.g., comparing a usage duration for a smartphone panelist to the average usage duration for the entire pool of smartphone panelists). The example indexer 130 also determines an average usage time for device types based on cross device usage survey responses and/or panel data. For example, an average usage duration may be calculated for an entire device type(s) panel (e.g., an average usage duration for a smartphone panel, an average cross device usage survey response for smartphone usage durations, etc.) The usage indices for device usage are used to identify matches to donate data to complete missing device data in a cross device panelist profile. The example indexer 130 associates each survey response with the corresponding panelist of the media device 120.

The example indexer 130 processes the responses indicating usage times from the cross device usage survey (e.g., surveyed usage times) and/or the device usage data obtained from panel data associated with the example media devices 120 (e.g., metered usage times). The example indexer 130 converts the usage durations to indexed values. An index value is a representation of a usage duration relative to an average usage duration. In the illustrated example, the example indexer 130 generates metrics, such as, for example, mean usage duration (and corresponding standard deviations) from the surveyed usage durations and the metered usage durations. The example indexer 130 determines a mean value and standard deviation of all available metered usage durations and surveyed usage durations. The example indexer 130 converts each usage duration to an index value (e.g., a usage duration index value) using the following Equation 1.

$$\text{Usage Duration Index Value} = \frac{(\text{usage duration to convert}) - (\text{mean usage duration})}{(\text{standard deviation})} + (\text{mean usage duration}) \quad \text{Equation 1}$$

In the above Equation 1, the example usage duration to convert may be one of a duration from a cross device usage survey response and/or a metered device usage duration, the example mean usage duration is the mean (e.g., average) usage duration of all cross device usage survey response durations and/or metered device usage durations available to the example indexer 130. The standard deviation is a value representative of the variation of usage durations from the mean usage duration for a corresponding device type available to the example indexer 130. For example, the standard deviation, when used to convert smartphone usage durations, may represent the average distance from the mean usage duration for all metered and/or cross device usage survey response smartphone usage durations. The addition of the mean usage duration ensures that no negative indexes may be calculated in the event that the usage duration to convert is below the mean usage duration. For example, if a mean usage duration for smartphones is twenty hours with a standard deviation of one, and a usage time to convert is 18 hours, the resulting index value using Equation 1 above would be an index value of 18.

$$\text{Usage Duration Index Value} = \frac{(18) - (20)}{(1)} + (20) = (-2 + 20) = 18$$

The example provisioner 135 of FIG. 1 identifies panelist(s) of a single device panel(s) that have indicated on the example survey that they utilize multiple devices and creates cross device panelist profiles for the identified panelists. The example provisioner 135 of the illustrated example, collects panel data from, for example, single device panelists (e.g., PC panelist) that indicated, on the survey provided by the example registrar 125, that they use multiple devices. Accordingly, the example provisioner 135 generates cross device panelist profiles for each of the single device panelists that indicated that they use multiple devices. In some examples, the example provisioner 135 identifies panelists of a single device panel that indicate use of another device not belonging to any single device panel (e.g., a PC panelist that indicates that they utilize a smartphone not registered to a panel). As data for the unmonitored smartphone is not available/accessible to the AME, smartphone panel data from another panelist may be matched and/or combined with the PC panelist's panel data. In order to facilitate matching of panelists, the example provisioner 135 collects the panel data associated with panelists of a single device panel (e.g., panelists of a single device panel who indicate usage of another device not belonging to any single device panel on a cross device usage survey) and transmits the panel data to the example matcher 140.

The example matcher 140 of the illustrated example of FIG. 1 matches panel data associated with panelists of a single device panel collected by the example provisioner 135 that indicate use of another device not belonging to any single device panel with panel data of another panelist for which monitoring data is collected in a single device panel. That is, for example, if a PC panelist indicates that they also utilize a smartphone that is unmonitored, the example matcher 140 matches the PC panelist to actual smartphone panel data from another panelist whose smartphone is monitored. For example, the example matcher 140 uses demographics and/or usage indices of the PC panelist to generate a pool of potential smartphone panel data from panelist(s) having the same demographics and/or usage indices as the PC panelist, as explained in further detail in conjunction with FIGS. 3 and 4A-4C.

In some examples explained further below (e.g., FIGS. 4A-4C) the example matcher 140 calculates a match factor to determine a suitable match for the cross device panelist profile (e.g., the cross device panelist profile of the PC panelist referred to above) created by the example provisioner 135. For example, demographics, economic factors, geographic location, etc. of the PC panelist and potential panelists that have the smartphone panel data are enumerated (e.g., given numeric values) and a data point (e.g., an nth dimensional data point, vector, magnitude, average, etc.) is calculated for each set of data (e.g., for each panelist) from the enumerated values. In such an example, the smartphone panel data of the panelist having a data point nearest to the PC panelist data point is determined to be a match to the PC panelist.

The example grafter 140 of the illustrated example obtains the matched PC panelist panel data and smartphone panel data identified by the example matcher 140. The example grafter 140 imputes (e.g., copies) the matched smartphone panel data into the cross device usage profile of the PC panelist. In the illustrated example, when the cross device usage profile of the PC panelist has been supplemented with the panel data of another device (e.g., smartphone panel data from another panelist), the cross device panelist profile is stored at the audience measurement entity or other data collection facility.

While the examples above are described with reference to a PC panelist that also utilizes a smartphone, any other devices and/or single device panel data may be utilized when generating and/or maintaining a cross device panel. Additionally, while single device panelists are described, other types of panels may also be utilized (e.g., multiple device panels).

Figure 2:
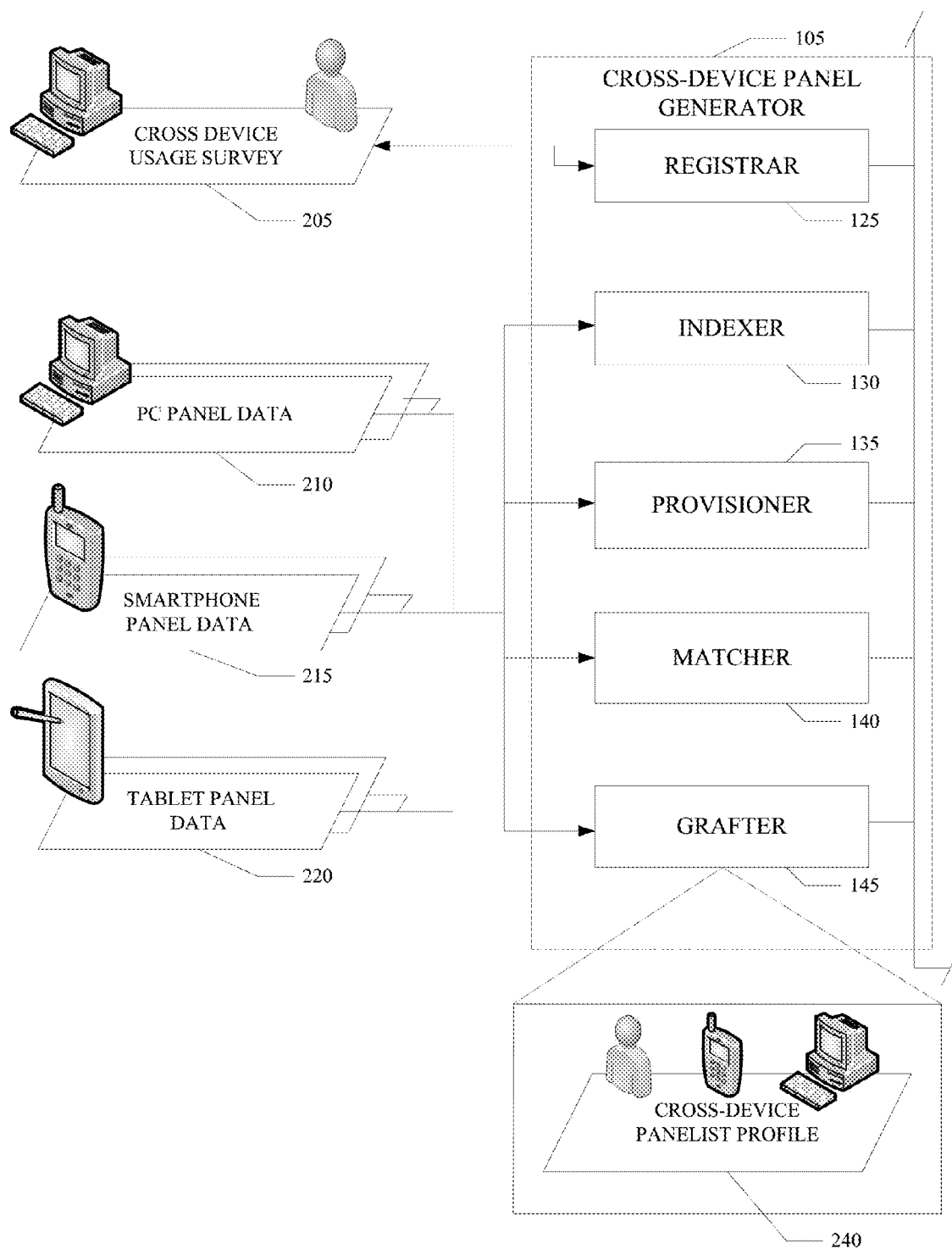
FIG. 2 is a block diagram illustrating an example flow of information through the example cross device panel generator of FIG. 1.

FIG. 2 is a block diagram illustrating the creation of an example cross device panelist profile 240. The example cross device panelist profile 240 is created when a panelist of a single device panel (e.g., a PC panelist) indicates multiple device usage (e.g., usage of a device not registered to a panel, in addition to the PC) on an example cross device usage survey response 205 (e.g., the survey described in conjunction with FIG. 1). In the illustrated example of FIG. 2, the example PC panelist reports on the example cross device survey response 205 that he/she also utilizes a smartphone. In the illustrated example of FIG. 2, the PC Panelist has not registered their smartphone for monitoring (i.e. has not agreed to have activities monitored on the smartphone). While FIG. 2 is discussed using PC and smartphone devices and panel data, any other panel data (e.g., television, radio, etc.) and/or combinations thereof may be used.

The example registrar 125 associates the example cross device usage survey response 205 with the PC panelist's panel data (e.g., a panel dataset from the example PC panel data 210) using an identifier of the panelist (e.g., an identifier provided by the panelist on the cross device usage survey response), an Internet Protocol (IP) address of the panelist's registered device, a media access control (MAC) address of the panelist's registered device, etc. In the illustrated example, the example registrar 125 tags the example PC panelist panel data for cross device panelist profile generation because the example PC panelist has indicated cross device usage (e.g., usage of the smartphone).

The example indexer 130 of FIG. 1 periodically and/or aperiodically, collects metered usage data (e.g., metered usage durations) from the example PC panel data 210, example smartphone panel data 215, and example tablet panel data 220. The metered usage durations are used in the calculation of various usage duration metrics, for example, total device usage duration, average duration of device use, standard deviation from average duration of device use, etc.

The indexer 130 of the example FIG. 2 accesses the example cross device usage survey response 205 provided by the example PC panelist. The example response 205 is associated with the PC panelist's PC panel data 210 by the example registrar 125 of FIG. 1, and contains the PC panelist's indicated smartphone usage. The surveyed usage duration and the metered usage duration are used by the example indexer 130 to calculate usage duration metrics. In the illustrated example of FIG. 2, the usage durations are converted to index values (e.g., representations of the duration of use versus the entire panel of the corresponding device) based upon an average usage for all similar devices (e.g., average usage by PC, smartphone, tablet, etc.). For example, if a mean usage duration for smartphones is twenty hours per week, the population of smartphones (e.g., all available smartphone usage durations) has standard deviation of one, and a usage duration to convert to an index value is 18 hours, the resulting index value using Equation 1 would result in an index value of 18. In some examples, the usage durations are converted to alternate values by the example indexer 130. For example, the usage durations may be maintained as time values, may be calculated as proportions to total usage, etc.

The example provisioner 135 of FIG. 2 collects the panel data tagged for cross device panelist profile generation by the example registrar 125 (e.g., all or a subset of the example PC panel data 210, the example smartphone panel data 215, and/or the example tablet panel data 220). The example provisioner 135 also determines which devices does not appear in the panel data. That is, for example, when a PC panelist indicates smartphone usage but the smartphone is unmetered the example provisioner 135 will determine that the panel data is lacking smartphone panel data. In the illustrated example, the example provisioner 135 collects the PC panelist's panel data and generates the cross device panelist profile 240. The example provisioner 135 determines that the cross device panelist profile 240 is deficient in smartphone media exposure and device usage information. The example provisioner 135 copies the PC panelist's PC panel data into the generated cross device panelist profile 240 and tags the cross device panelist profile 240 as deficient in smartphone panel data.

The example matcher 140 of the illustrated example obtains the generated cross device panelist profile 240 and identifies the type of device that does not appear in the panel data identified by the example provisioner 135 (e.g., smartphone panel data). The example matcher 140 searches for donor panel data based on the identified type of device that does not appear in the panel data. As used herein, donor panel data is defined to be panel data obtained from devices corresponding to the deficiency identified by the example provisioner 135 and associated with (e.g., transferred, copied, linked, etc.) the cross device panelist profile 240. In the illustrated example, the example matcher 140 searches the smartphone panel data 215 (e.g., panel data for smartphone usage and media exposure for a plurality of smartphone panel panelists) for donor panel data having usage indices and/or demographics matching that of the PC panelist. In the event that more than one set of smartphone panel data 215 (e.g., smartphone panel data from two or more panelists) matches the usage indices and/or demographics of the PC panelist, the example matcher 140 enumerates (e.g., assigns a numerical value to) panelist identification data associated with the cross device panelist profile 240 and panelist identification data associated with each of the potential donors of the smartphone panel data 215. The enumeration of panelist identification data allows for a finer granularity comparison beyond "match filtering." That is, by enumerating multiple data points, a numerical comparison (e.g., distance comparison) may be performed when filtering either (1) does not produce a match and/or (2) produces too many matches. Other panelist identification data, such as, for example, age, ethnicity, sex, regional location, education level, income, preferred media genre, etc. may be assigned a numeric value by the example audience measurement entity 110 of FIG. 1. In the illustrated example, the enumerated values are all assigned a single axis value in a multidimensional space. However, in some implementations, an individual enumeration may be multi-dimensional.

In some examples, each enumerated value of panelist identification data may represent a value for one dimension of an n-th dimensional data point (or vector) to perform match factor calculations. In the illustrated example, match factors are calculated using distance measures. For example, a thirty year old male college graduate (e.g., age, sex, and highest completed education level) in such an example would be enumerated as [30, 2, 16]. Multi-dimensional distance values are calculated between the generated cross device panelist profile 240 and the potential donor matches (e.g., a point to point distance which equates to a center to center value). For example, a Mahalanobis and/or Bhattacharyya distance can be used to calculate the distance between the cross device panelist profile 240 and the potential donor matches. Further, a Pitman closeness criterion may also be utilized where more than one calculated distance value is equally close to the enumerated panelist identification data center to choose the most optimal match to the cross device panelist profile 240. Alternatively, match factors may be calculated or determined using scales, weighting, string matching, regression analysis, Bayesian inference, etc.

Using one or more of the above techniques, the example matcher 140 of the illustrated example chooses the best matching donor panel data (e.g., smartphone panel data 215). The example matcher 140 transmits the best matching donor panel data and the cross device panelist profile 240 to the example grafter 145. The example grafter 145 imputes (e.g., copies, extracts, links, etc.) the donor smartphone panel data into the cross device panelist profile creating a completed cross device panelist profile 240 for a panelist of a single device panel. For example, to complete the cross device panelist profile 240 for a panelist who owns a smartphone but is not registered for smartphone panel metering, the example matcher 140 identifies smartphone usage and/or media exposure data from a different but similarly situated panelist and the example grafter 145 copies, imports, links, and/or associates the identified smartphone usage and/or media exposure data into the example cross device panelist profile 240. Thus, in some examples, the cross device profile generator 105 solves the problem of determining cross device media exposure and/or device usage where panel data is not available for some devices of panelists of a single device panel.

Figure 3:
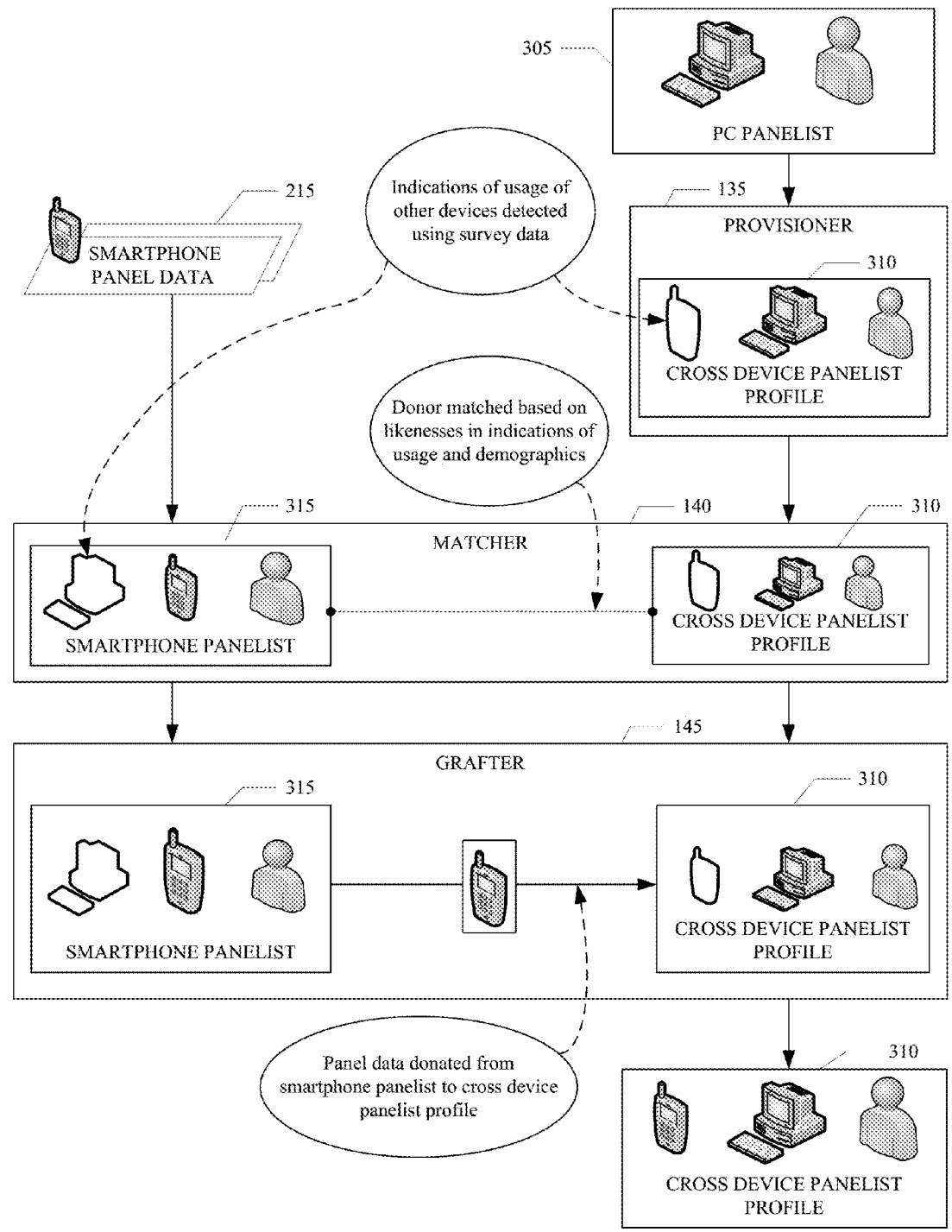
FIG. 3 is a process diagram illustrating an example profile linkage performed by the example cross device panel generator of FIG. 1.

FIG. 3 is a process diagram illustrating example matching and grafting of data between panelists. In the illustrated example, an example PC panelist 305 who is currently a single panel panelist (e.g., a person that has registered for a PC panel and no other panel) has completed a cross device usage survey and indicated smartphone usage. However, because the PC panelist 305 is a single panel user, he/she has not registered their smartphone device for participation in a smartphone panel. The example registrar 125 of the example of FIG. 1 tags the example PC panelist for cross device profile generation when multiple device use is indicated on the PC panelist's cross device usage survey response. The example indexer 130 transforms the usage duration of the metered PC (e.g., actual usage duration as measured by a meter installed on the panelist's PC) and the surveyed smartphone usage (e.g., self-indicated usage duration as indicated by the panelist on the survey) into corresponding indices based on the total amounts of measured PC usage and reported smartphone usage.

The example provisioner 135 generates a cross device panelist profile 310 for the example PC panelist 305. Additionally, the example provisioner 135 determines that the PC panelist is not associated with smartphone panel data but has reported smartphone usage in the survey response. Thus, the example provisioner 135 determines that there is a deficiency of smartphone panel data in the cross device panelist profile.

The example matcher 140 of example FIG. 3 searches example smartphone panel data 215 for potential donor panel data. The smartphone panel data 215 of other panelists is associated with panelist identification data and/or cross device usage survey responses from the other panelists. In some examples, each set of smartphone panel data in the searchable pool of the smartphone panel data 215 is associated with cross device indicated usage (e.g., usage of a device that is not a registered smartphone). For example, a smartphone panelist may indicate PC usage of a PC not registered to a PC panel and/or PC usage by the other panelist may be measured for a PC panel. In the illustrated example the example matcher 140 conducts the search using the age, sex, and ethnicity of the cross device panelist profile 310 and the usage indices of the cross device panelist's 310 PC and smartphone usage as calculated by the example indexer 130 of FIG. 1. While, in the illustrated example, age sex and ethnicity are used, any other factors may additionally or alternatively be used such as, for example, education level, media genre preferences, income bracket, regional location, employment status, cellular service carrier, housing type, etc.

The example matcher 140 obtains a match of smartphone panel data having matching age, sex, ethnicity, and usage indices. In the illustrated example, the matching smartphone panel data 315 was associated with a panelist that indicated PC usage of a usage index matching the metered usage index of the PC of the cross device panelist 310, and the smartphone panel data 315 contained metered smartphone usage of a usage index matching the usage index of the value indicated by the cross device panelist 310 in the cross device usage survey response. The example matcher 140 establishes a link between the smartphone panel data 315 and the cross device panelist profile 310 and transmits the smartphone panel data 315 and the cross device panelist profile 310 to the example grafter 145. The example grafter 145 imputes (e.g., copies, extracts, links, etc.) the donor smartphone panel data into the cross device panelist profile 310 creating a completed cross device panelist profile 310.

Figure 4B:
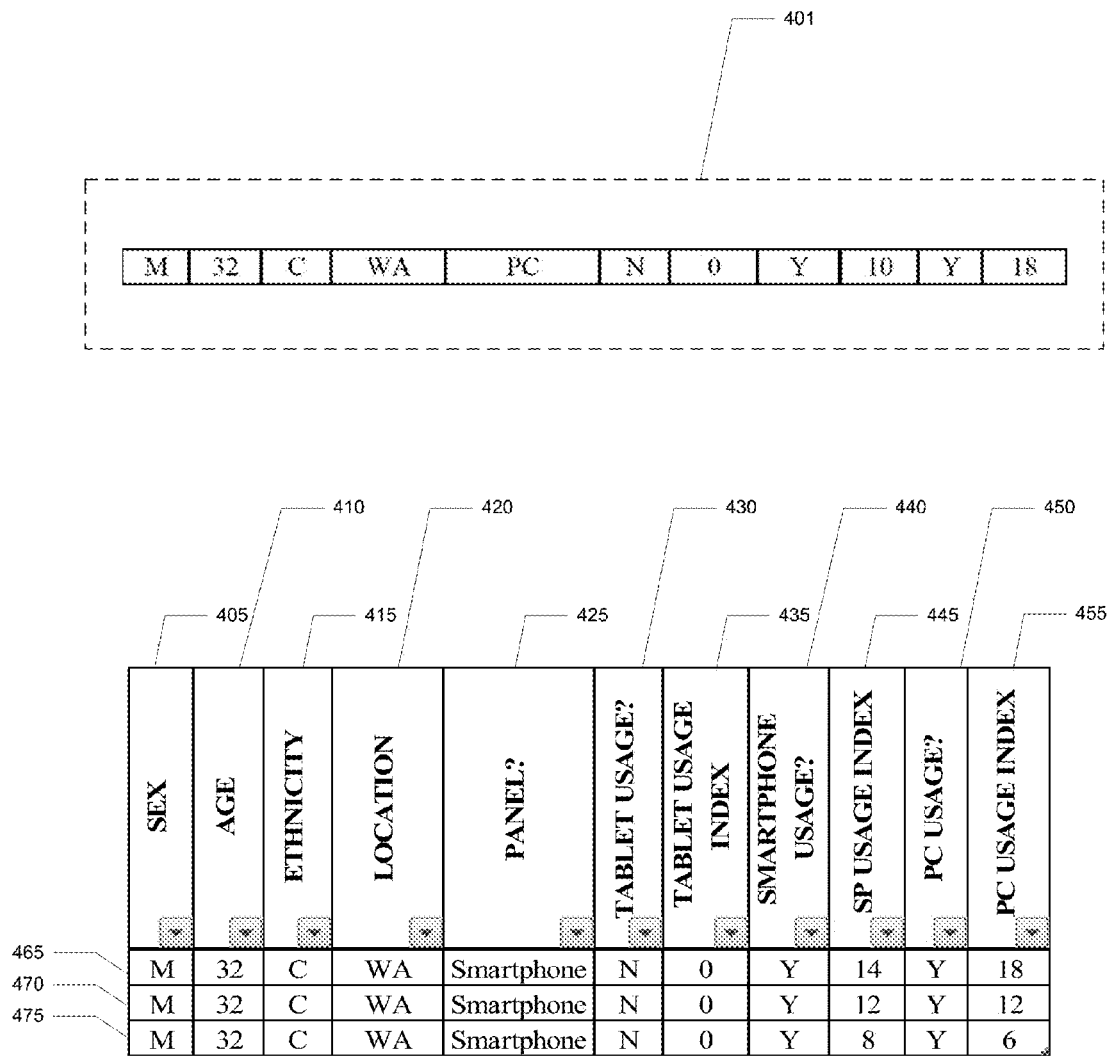
Figure 4C:
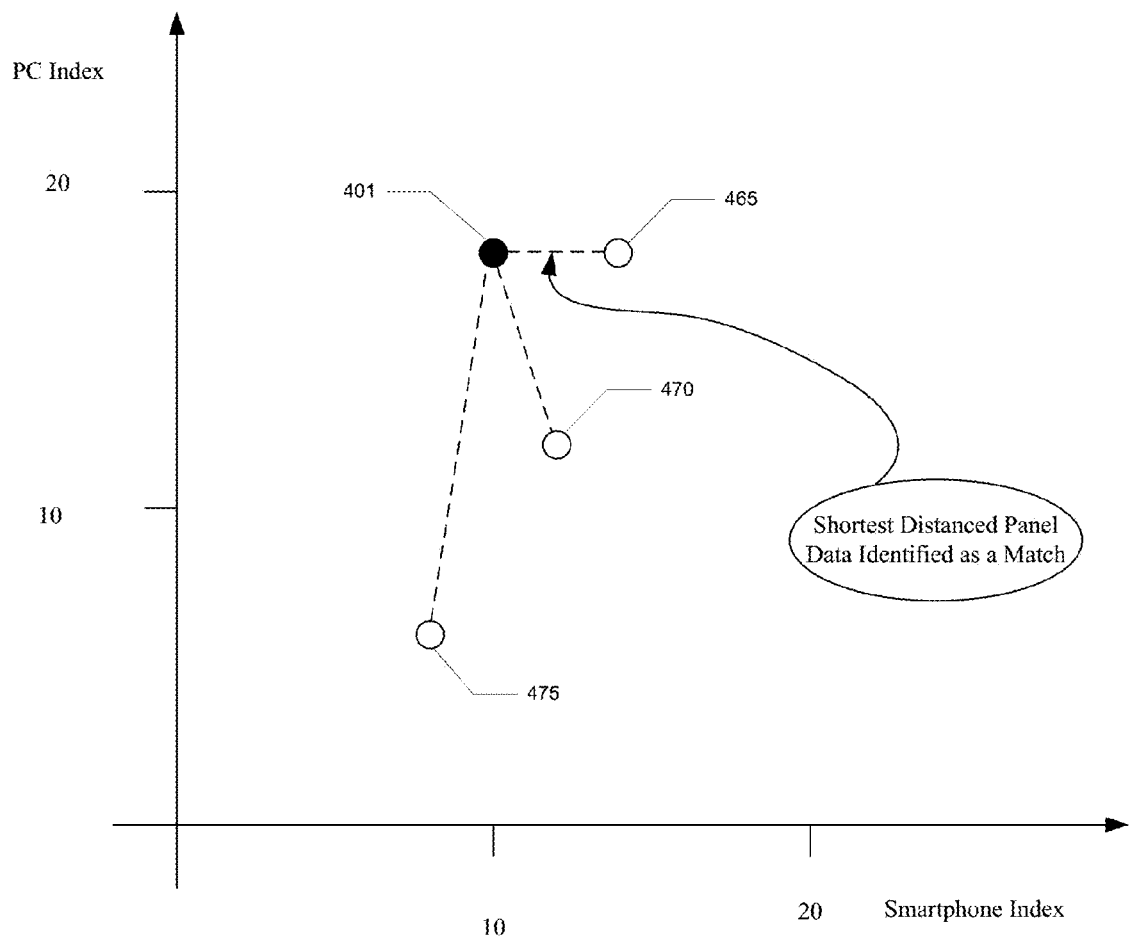
FIG. 4C illustrates example donor panel matching performed by the example cross device panel generator of FIG. 1.

FIGS. 4A-4B are data tables illustrating example panel data matching by the example cross device panel generator of FIG. 1 using cross device usage surveys. FIGS. 4A-4C illustrate the matching using example data tables 401, 457, which contain example responses 405, 410, 415, 420, 430, 435, 440, 445, 450, 455 to an example cross device usage survey. The example responses depicted in FIGS. 4A-4C are sex 405, age 410, ethnicity 415, location (e.g., state of residence) 420, panel to which the respondent belongs 425, indication of tablet usage 430, tablet usage index (e.g., indicated usage duration provided in the cross device usage survey and indexed against all available tablet usage by the example indexer 130) 435, indication of smartphone usage 440, smartphone usage index (e.g., indicated usage duration provided in the cross device usage survey and indexed against all available smartphone usage by the example indexer 130) 445, indication of PC usage 450, and PC usage index (e.g., indicated usage duration provided in the cross device usage survey and indexed against all available PC usage by the example indexer 130) 455. In some examples, other factors such as education level, media genre preferences, income bracket, regional location, employment status, cellular service carrier, housing type, etc. may additionally or alternatively used to provide finer granularity in profile matching.

In example FIG. 4A, the example provisioner 135 has identified an example data 401 for a PC panelist who has indicated smartphone usage in a cross device usage survey. The example PC panelist is a 32 year old male residing in Washington State who has indicated cross device (e.g., PC and smartphone) usage. The example PC panelist's indicated smartphone usage is determined to be an index value of ten and his PC usage is determined to be an index value of eighteen. In the illustrated example, each cross device usage survey is associated with a corresponding set of panel data. To this end, the example matcher 140 gathers cross device usage survey responses 457 that include smartphone usage data for use in matching the example PC panelist to a corresponding donor panel data.

FIG. 4B illustrates a first pass of filtering by the example matcher 140 to identify donor panel data using the demographics of the example PC panelist 401 indicated in the cross device usage survey. That is, the available panel data is filtered to identify responses from the cross device usage survey that match the responses in the example data 401 for sex 405, age 410, ethnicity 415, and location 420. The remaining survey data responses 465, 470, 475 originate from smartphone panelists who are thirty two year old males from Washington state. In the illustrated example, no survey data contains an exact match to the usage indices of the example PC panelist 401. Thus, the example matcher 140 determines a distance measure of the example data 401 from the survey data to the usage indices of the example PC panelist survey response.

FIG. 4C illustrates example donor panel matching performed by the example matcher 140 to determine a match from the remaining profiles 465, 470, 475. When an exact match to usage indices is not possible, the example matcher 140 calculates a match factor to find a best fit. In some examples, information is enumerated (e.g., converted into a numerical format) and used to calculate a match factor through a matching equation. In the illustrated example of FIG. 4C, the match factor is calculated by the example matcher 140 based on the usage indices. The example matcher 140 in the illustrated example uses a distance calculation:

$$\text{Distance} = \sqrt{(x_2-x_1)^2+(y_2-y_1)^2} \qquad \text{Equation 2}$$

In Equation 2, $x_1$ is an enumerated value for a first factor (e.g., location) of a first panelist (e.g., the PC panelist), $x_2$ is an enumerated value for the first factor of a second panelist (e.g., a potential donor panelist), $y_1$ is an enumerated value for a second factor (e.g., age) of the first panelist, and $y_2$ is an enumerated value for the second factor of the second panelist. In the illustrated example, Equation 2 determines a distance according to two factors. (e.g., the PC and Smartphone usage indices). However any other numbers and/or types of factors may additionally or alternatively be used. In some examples where multiple enumerated values are used to describe panelists, a Mahalanobis and/or a Bhattacharyya distance can be used to facilitate calculating the distance between the cross device panelist profile and the potential donor matches.

The example matcher 140 performs the distance calculation on the survey data remaining after the filtering performed in FIG. 4B. Thus, in the illustrated example, the match factor for each of remaining survey data elements 465, 470, 475 are the distance from the usage indices 401 of the PC panelist to the indices of the remaining survey data elements 465, 470, 475. Accordingly, in the illustrated example, the shortest distance, which is associated with donor panel data 465, is selected as the best match for donor panel data because it most closely resembles the usage and/or behavior of the PC panelist 401. In the illustrated example, the determined matching profile 465 is identified to the example grafter 145 to provide donor smartphone panel data to the example PC panelist 401 in accordance with examples disclosed herein.

While an example manner of implementing the cross device panel generator 105 is illustrated in FIG. 1-3, one or more of the elements, processes and/or devices illustrated in FIG. 1-3 may be combined, divided, re-arranged, omitted, eliminated and/or implemented in any other way. Further, the example registrar 125, the example indexer 130, the example provisioner 135, the example matcher 140, the example grafter 145 and/or, more generally, the example cross device panel generator 105 of FIGS. 1-3 may be implemented by hardware, software, firmware and/or any combination of hardware, software and/or firmware. Thus, for example, any of the example registrar 125, the example indexer 130, the example provisioner 135, the example matcher 140, the example grafter 145 and/or, more generally, the example cross device panel generator 105 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example registrar 125, the example indexer 130, the example provisioner 135, the example matcher 140, the example grafter 145 are hereby expressly defined to include a tangible computer readable storage device or storage disk such as a memory, a digital versatile disk (DVD), a compact disk (CD), a Blu-ray disk, etc. storing the software and/or firmware. Further still, the example cross device panel generator 105 may include one or more elements, processes and/or devices in addition to, or instead of, those illustrated in FIG. 1-3, and/or may include more than one of any or all of the illustrated elements, processes and devices.

Figure 5:
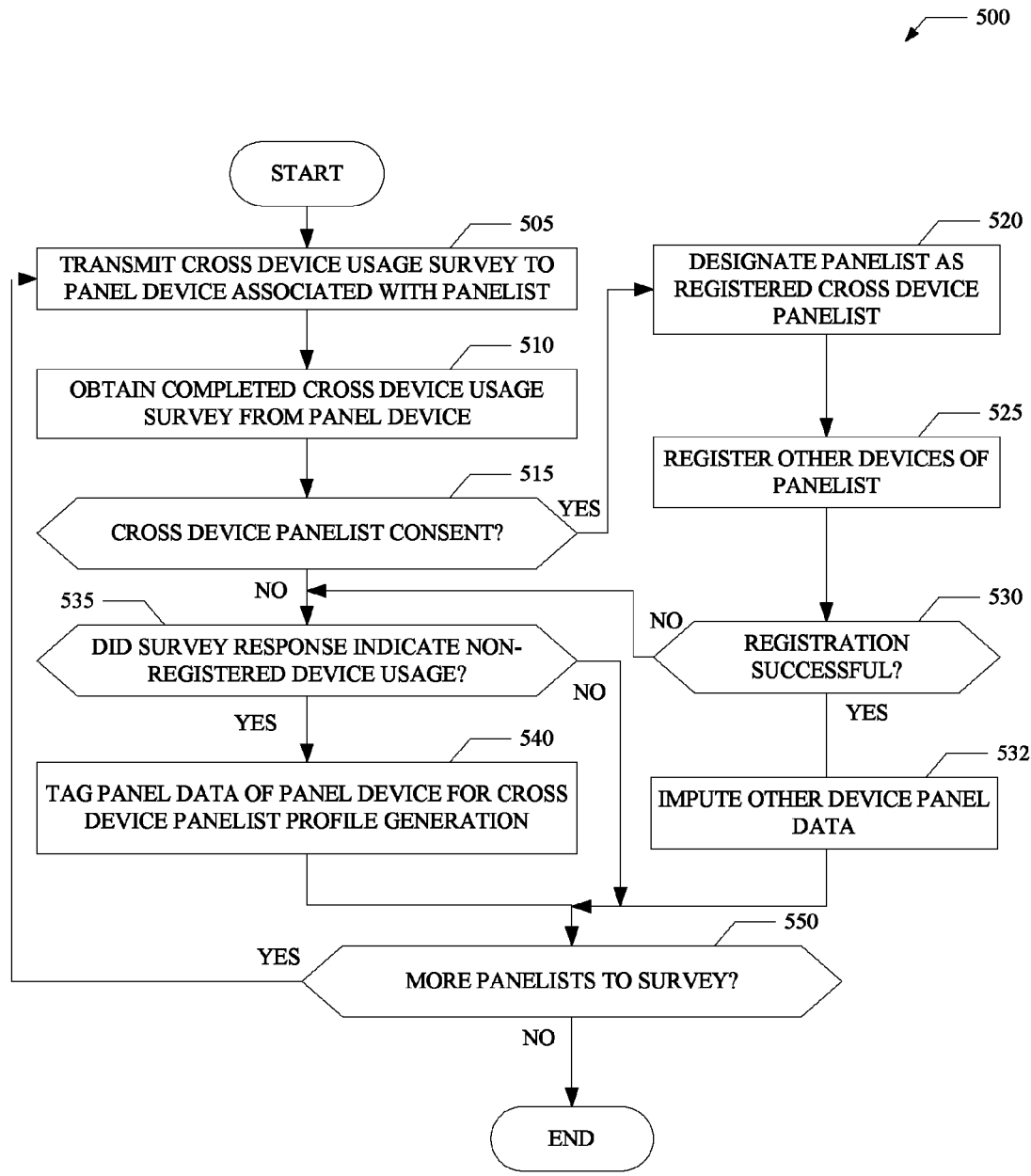
FIG. 5 is a flowchart representative of example machine readable instructions that may be executed to implement the example cross device panel generator of FIG. 1.
Figure 6:
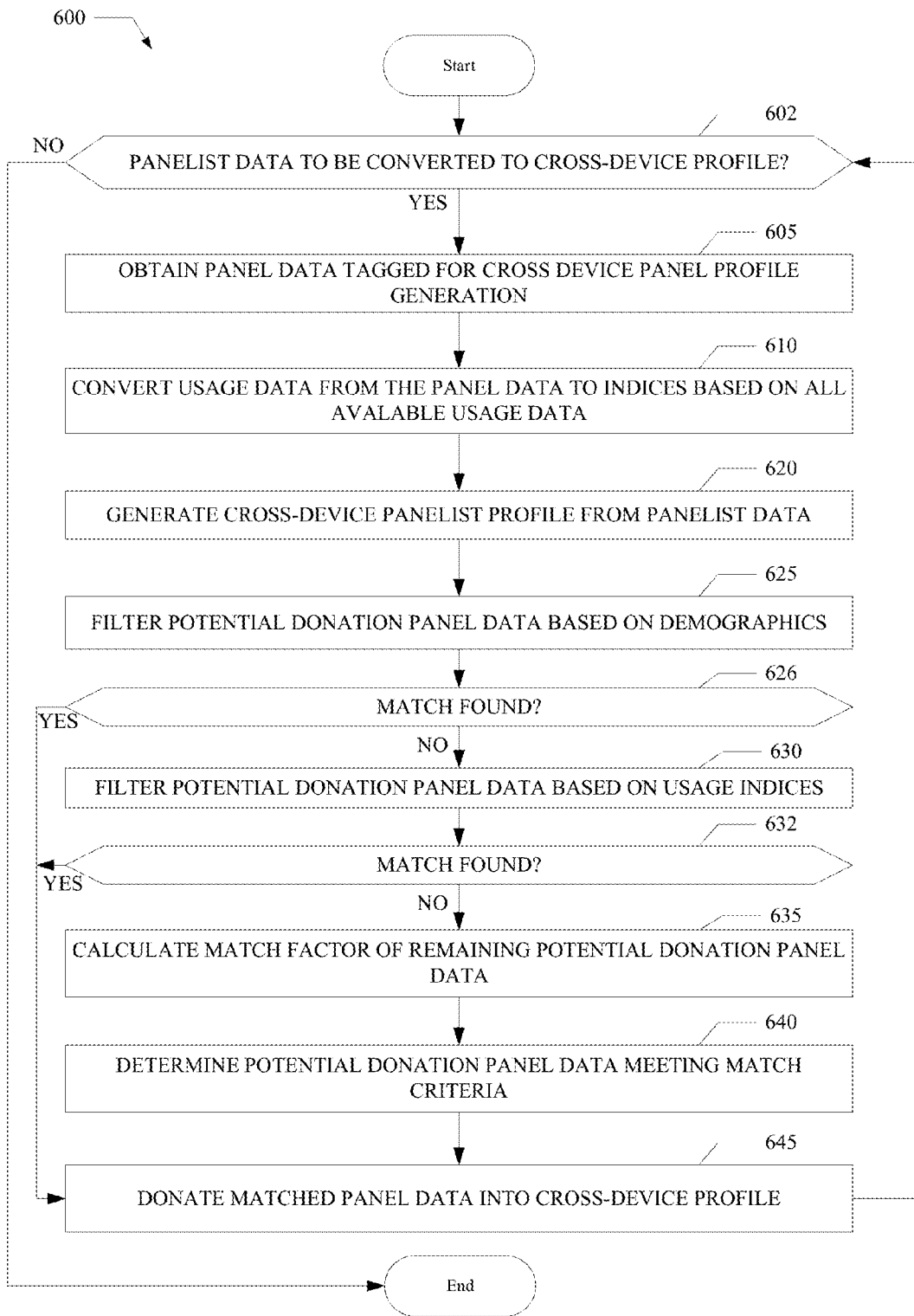
FIG. 6 is a flowchart representative of example machine readable instructions that may be executed to implement the example cross device panel generator of FIG. 1.

Flowcharts representative of example machine readable instructions for implementing the example cross device panel generator 105 of FIGS. 1, 2, and/or 3 are shown in FIGS. 5 and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example cross device panel generator 105 may alternatively be used. For example, the order of execution of the blocks may be changed, and/or some of the blocks described may be changed, eliminated, or combined.

As mentioned above, the example processes of FIGS. 5 and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of example machine readable instructions 500 that may be executed to implement the example registrar 125 of the example cross device panel generator 105 of example FIGS. 1, 2, and/or 3. The program 500 begins at a specified interval designated by the example audience measurement entity 110 of FIG. 1 to measure a cross device audience.

The example registrar 125 transmits a cross device usage survey to a registered panel device 120 (block 505). The example registrar 125 receives a cross device usage survey response 205 from the registered panel device 120 (block 510). The example registrar 125 determines from the completed response 205 if the panelist has consented to become a cross device panelist (block 515).

If the panelist has consented to become a cross device panelist (block 515), the registrar 125 records that the panelist is a registered cross device panelist and a corresponding cross device panelist profile is generated by the example provisioner 135 for the panelist (block 520). The example registrar 125 sends registration instructions (e.g., proxy configuration instructions) and/or metering software for and/or to the devices that are not in a registered panel but were identified by the now registered cross device panelist in block 505 (block 525). Alternatively, if all devices of the cross device panelist are registered (e.g., in other single device panels), the example registrar 125 will obtain the identity of the devices from the survey response 205. A confirmation of device registration is sent in an acknowledgement request from the example registrar 125 to the devices to determine if the cross device panelist has completed the registration process (block 530). If the cross device panelist has successfully registered the other devices, panel data from the other devices is imputed from the single device panels associated with the panelist's information into the cross device panelist profile generated at block 520 by the example registrar 125 (block 532). The example registrar 125 then determines if more panelist are to be surveyed (block 550).

If the cross device panelist has not successfully registered their other devices (block 530) or they have has not consented to become a cross device panelist (block 515), the example registrar 125 determines from the responses if other (e.g., non-registered) device usage was indicated (block 535). If non-registered device usage was not indicated, the panelist may not be used to create or donate to cross device panelist profiles and the example registrar 125 determines if there are more panelists to survey (block 550).

If non-registered device usage was indicated by the panelist (block 535), the example registrar 125 tags the panel data for cross device panelist profile generation (block 540). The example registrar 125 determines if more panelists are to be surveyed (block 550). If more panelists are to be surveyed, then a new survey is transmitted to a new panelist of a single device panel (block 505). When no other panelists are to be surveyed, the program 500 terminates.

While the example process of FIG. 5 attempts to create a cross device panelist profile for a panelist that has not consented to become a cross device panelist, in some examples panelists that do not consent are excluded from use in a cross device panel.

FIG. 6 is a flowchart representative of example machine readable instructions 600 that may be executed to implement the example cross device panel generator 105 of example FIGS. 1, 2, and/or 3. The example program 600 begins when the example provisioner 135 determines if single device panel data is tagged (e.g., block 540 of FIG. 5) by the example registrar 125 for cross device profile generation (block 602).

If single device panel data is tagged for cross device profile generation (block 602), the example indexer 130 obtains the panel data tagged by the example registrar 125 for cross device panel profile generation (block 605). The example indexer 130 converts the total usage duration from the panel data to index usage values based on all available usage data for the corresponding device type from other panelists (block 610).

The example provisioner 135 accesses the panelist data and creates a cross device panelist profile using the panelist data (block 620). For example, the demographic information and/or other panelist identification data included in the panelist data are associated with the cross device panelist profile by the example provisioner 135. The example provisioner 135 also determines what type of device panel data will be needed to complete the cross device panelist profile. That is, completing the cross device panelist profile 240 is performed by searching for donor panel data (e.g., smartphone panel data 315 of FIG. 3) corresponding to the non-paneled device(s) that the panelist reported usage of in the cross device usage survey 205 administered by the example registrar 125.

The cross device panelist profile (e.g., the incomplete cross device panelist profile) is transmitted to the example matcher 140 which begins a first search for donor panel data using demographic data (block 625). If a single set of potential donor panel data remains after starting a search, the example matcher 140 forwards the matching donor panel data and the cross device panelist profile to the example grafter 145 (block 626). If multiple sets of potential donor panel data remain, the returned multiple matches from the first search are further filtered by the example matcher 140 based on usage indices (e.g., calculated index values) which correspond to the metered and indicated usage of the cross device panelist profile (block 630). If a single set of potential donor panel remains after the further filtering (block 630), the example matcher 140 forwards the match and the cross device panelist profile to the example grafter 145 (block 632).

If multiple matches remain after the further filtering (block 630), the example matcher 140 performs match factor calculations (e.g., distance calculations, scaling, weighting, Bayesian inference, etc.) on the remaining matches (block 635). The example matcher 140 determines the one of the remaining matches that most closely meets the match factor and selects the matching donor panel data as the match to the cross device panelist profile (block 640).

The example matcher 140 forwards the match and the cross device panelist profile to the example grafter 145 where the example grafter 145 imputes the data from the donor panel into the cross device panelist profile (block 645). While imputation by the example grafter 145 (block 645) in the illustrated example is discussed after match factor calculation (block 640), it should be appreciated from the foregoing that the example grafter 145 imputes the data when a match is identified (e.g., blocks 626, 632, 640). The example provisioner then determines if any remaining panel data has been tagged for cross device panelist profile generation (block 602). If no panel data remains, the example program 600 terminates.

Figure 7:
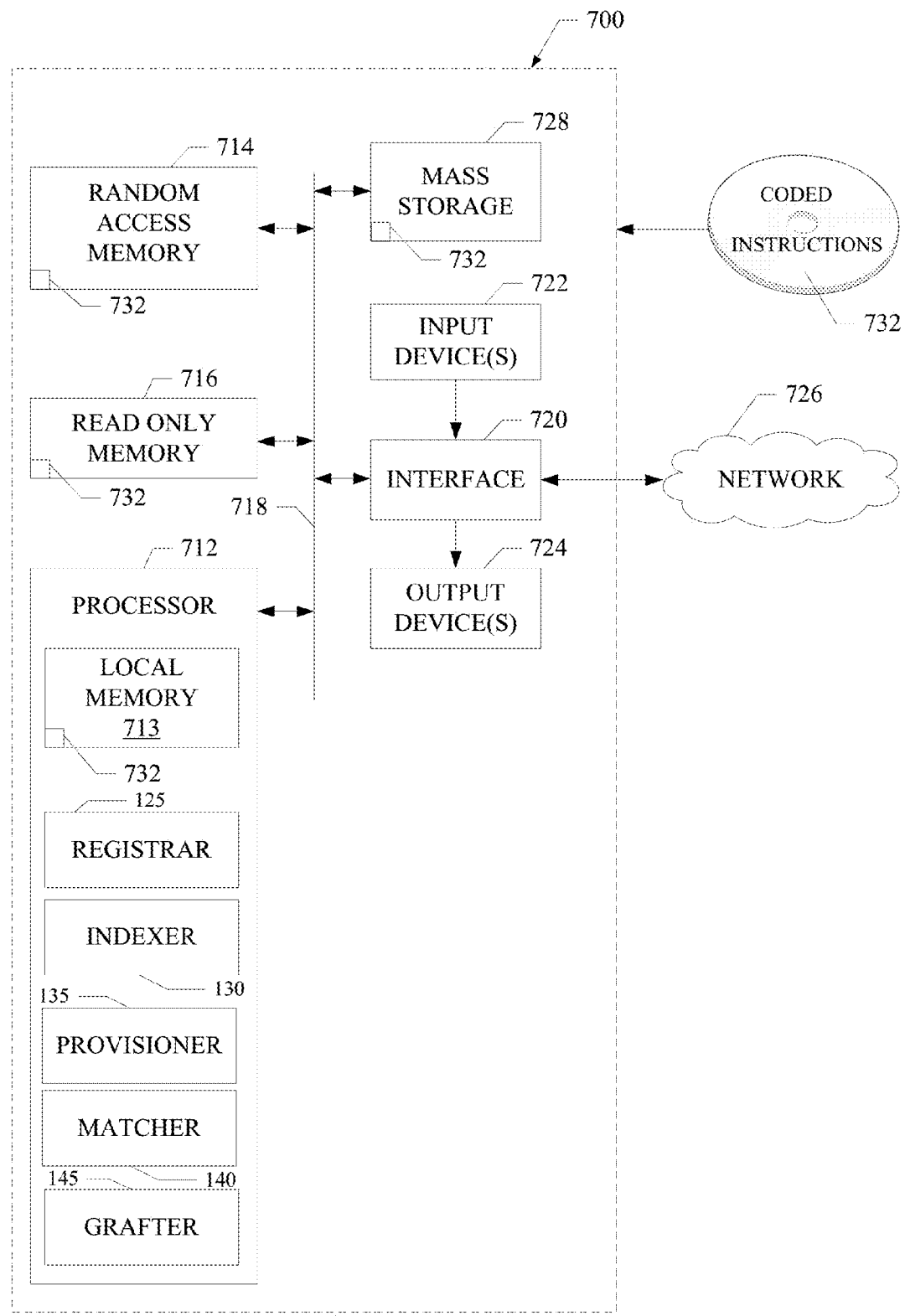
FIG. 7 is a block diagram of an example processor platform structured to execute the instructions of FIGS. 5 and/or 6 to implement the example cross device panel generator of FIG. 1.

FIG. 7 is a block diagram of an example processor platform 700 capable of executing the instructions of FIGS. 5 and/or 6 to implement the cross device panel generator 105 of FIGS. 1, 2, and 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The processor platform 700 of the illustrated example also includes the example registrar 125, the example indexer 130, the example provisioner 135, the example matcher 140, the example grafter 145 and/or, more generally, the example cross device panel generator 105 of FIGS. 1, 2, and/or 3.

The coded instructions 732 of FIGS. 4 and/or 5 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture measure a cross device audience through generation of a cross device panel. The methods, apparatus and articles of manufacture disclosed herein allow an audience measurement entity to generate a cross device panel by leveraging existing single device panels. For example, new and/or additional metering software and/or proxy devices are not required for the construction of such a cross device panel. The cross device panel generation performed using methods disclosed herein further allows for historical cross panel generation. For example, the matches (and their corresponding past panel data) determined by the example cross device panel generator may be used to create historical cross device panel data. Historical cross device panels may allow for more granular views into how cross device usage trends have developed. Such historical cross device panels may be analyzed to better understand historical device interaction as well.

Using example approaches disclosed herein, the need for additional metering software and/or proxy devices (e.g., beyond those required for single device panels) is alleviated. By alleviating the need for such additional metering software and/or proxy devices network bandwidth is conserved. For example, the amount of network traffic required to administer the cross device usage surveys are miniscule and, thus, do not represent any additional strain on network bandwidth. By leveraging the information from existing single device panels, thousands of duplicate cross device panel data are not required to be sent to the cross device panel generator. On the contrary, the panel data required to generate such a cross device panel may all pre-exist at an audience measurement entity, for example.

The ability to generate cross device panels at the audience measurement entity ensures that media devices and/or proxy servers do not require reconfiguration either through additional meters or proxy configuration instructions. Implementing cross device usage surveys in lieu of such reconfiguration conserves crucial processor resources, system memory, and network bandwidth of the media devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining that a first panelist associated with first panel data and a first device is also associated with a non-paneled device;
   matching, via a processor, a second panelist associated with second panel data to the first panelist based on (1) the second panelist having demographics matching the first panelist and (2) the second panelist being associated with a second device of a same device type as the non-paneled device of the first panelist; and
   generating a cross device panelist profile for the first panelist, the cross device panelist profile including at least some of the first panel data and at least a portion of the second panel data.

2. A method as defined in claim 1, wherein the determining that the first panelist is associated with the non-paneled device is based on a response to a cross device usage survey.

3. A method as defined in claim 1, wherein the matching of the second panelist to the first panelist is further based on first usage of the non-paneled device by the first panelist and second usage of the second device by the second panelist.

4. A method as defined in claim 1, wherein the matching of the second panelist to the first panelist further includes, selecting the second panelist from a plurality of panelists associated with the second panel data by:
   assigning numerical values to demographic information of corresponding ones of the plurality of panelists;
   determining index values for each of device usage durations and surveyed device usage durations of types of devices similar to the type of the non-paneled device of the first panelist, the device usage durations and the surveyed device usage durations associated with a corresponding one of the plurality of panelists; and
   determining a match factor for each of the corresponding ones of the plurality of panelists using at least one of the numerical values and the index values.

5. A method as defined in claim 4, wherein the index values are determined for the corresponding ones of the plurality of panelists based on an average device usage duration and an average surveyed device usage duration of the plurality of panelists.

6. A method as defined in claim 4, wherein the match factor is calculated using a distance measurement.

7. A method as defined in claim 1, wherein the matching of the second panelist to the first panelist is further based on cross device usage survey responses received from the first panelist and the second panelist.

8. An apparatus comprising:
   a provisioner to determine that a first panelist associated with first panel data and a first device is also associated with a non-paneled device, and to generate a cross device panelist profile for the first panelist;
   a matcher to match a second panelist associated with second panel data to the first panelist based on (1) the second panelist having demographics matching the first panelist and (2) the second panelist being associated with a second device of a same device type as the non-paneled device of the first panelist; and
   a grafter to impute at least some of the first panel data and at least a portion of the second panel data into the cross device profile.

9. An apparatus as defined in claim 8, wherein the provisioner is to determine that the first panelist is associated with the non-paneled device based on a response to a cross device usage survey.

10. An apparatus as defined in claim 8, wherein the matcher is to match the second panelist to the first panelist based on first usage by the non-paneled device of the first panelist and second usage of the second device by the second panelist.

11. An apparatus as defined in claim 8, wherein the matcher is to assign numerical values to demographic information of corresponding ones of a plurality of panelists.

12. An apparatus as defined in claim 11, further including an indexer to determine index values for each of device usage durations and surveyed device usage durations of types of devices similar to the type of the non-paneled device of the first panelist, the device usage durations and the surveyed device usage durations associated with corresponding ones of the plurality of panelists.

13. An apparatus as defined in claim 12, wherein the matcher is to determine respective match factors for the corresponding ones of the plurality of panelists using at least one of the numerical values and the index values.

14. An apparatus as defined in claim 11, wherein the matcher is to match the second panelist to the first panelist based on cross device usage survey responses received from the first and the second panelist.

15. A tangible computer readable storage medium comprising instructions that, when executed, cause a machine to at least:
   determine that a first panelist associated with first panel data and a first device is also associated with a non-paneled device;
   match a second panelist associated with second panel data to the first panelist based on (1) the second panelist having demographics matching the first panelist and (2) the second panelist being associated with a second device of a same type as the non-paneled device of the first panelist; and
   generate a cross device panelist profile for the first panelist, the cross device panelist profile including at least some of the first panel data and at least a portion of the second panel data.

16. A tangible computer readable storage medium as defined in claim 15, wherein the instructions further cause the machine to determine that the first panelist is associated with the non-paneled device based on a response to a cross device usage survey.

17. A tangible computer readable storage medium as defined in claim 15, wherein the instructions further cause the machine to match the second panelist to the first panelist further based on first usage of the non-paneled device by the first panelist and second usage of the second device by the second panelist.

18. A tangible computer readable storage medium as defined in claim 15, wherein, to match the second panelist to the first panelist, the instructions further cause the machine to select the second panelist from a plurality of panelists associated with the second panel data by:
   assigning numerical values to demographic information of corresponding ones of the plurality of panelists;
   determining index values for each of device usage durations and surveyed device usage durations of types of devices similar to the type of the non-paneled device of the first panelist, the device usage durations and the surveyed device usage durations associated with a corresponding one of the plurality of panelists; and
   determining a match factor for each of the corresponding ones of the plurality of panelists using at least one of the numerical values and the index values.

19. A tangible computer readable storage medium as defined in claim 18, wherein index values are determined for the corresponding ones of the plurality of panelists based on an average device usage duration and an average surveyed device usage duration of the plurality of panelists.

20. A tangible computer readable storage medium as defined in claim 18, wherein the instructions further cause the machine to calculate the match factor using a distance measurement.

21. A tangible computer readable storage medium as defined in claim 15, wherein the instructions further cause the machine to match the second panelist to the first panelist further based on cross device usage survey responses received from the first panelist and the second panelist.

\* \* \* \* \*